United States Patent
Li et al.

(10) Patent No.: US 7,570,404 B2
(45) Date of Patent: Aug. 4, 2009

(54) MULTI-STATE OPTICAL SWITCH AND COMBINER FOR USE IN A LIGHT ENGINE AND IMAGE PRESENTATION DEVICE USING THE SAME

(75) Inventors: Lin Li, St. Petersburg, FL (US); Israel J. Morejon, Tampa, FL (US); Evan O'Sullivan, Safety Harbor, FL (US)

(73) Assignees: Jabil Circuit, Inc.; Delaware Corporation ( * ) Notice: Subject to any disclaimer, the term of this patent is extended or adjusted under 35 U.S.C. 154(b) by 307 days.

(21) Appl. No.: 11/377,106

(22) Filed: Mar. 16, 2006

(65) Prior Publication Data
US 2007/0216979 A1 Sep. 20, 2007

(51) Int. Cl.
*G02B 5/32* (2006.01)
*G02F 1/153* (2006.01)
*G02B 27/14* (2006.01)
*H04N 9/69* (2006.01)
*G03B 21/28* (2006.01)

(52) U.S. Cl. ............... 359/15; 359/267; 359/634; 348/757; 353/98

(58) Field of Classification Search ............ 359/15, 359/634, 267; 362/296, 297, 298, 300; 348/744, 348/750, 751, 757; 353/50, 51, 81, 98, 99
See application file for complete search history.

(56) References Cited

U.S. PATENT DOCUMENTS

| | | | |
|---|---|---|---|
| 5,875,012 A | 2/1999 | Crawford et al. | |
| 6,166,800 A | 12/2000 | Silverstein et al. | |
| 6,373,603 B1* | 4/2002 | Popovich et al. | 359/15 |
| 6,678,078 B1* | 1/2004 | Popovich et al. | 359/15 |
| 2001/0019434 A1* | 9/2001 | Popovich et al. | 359/15 |

* cited by examiner

*Primary Examiner*—Alessandro Amari
(74) *Attorney, Agent, or Firm*—Price, Heneveld, Cooper, DeWitt & Litton, LLP

(57) ABSTRACT

An image presentation device (100) incorporates an optical combiner (130) that utilizes a multi-state optical switch (131, 137) for use with a plurality of colored light sources (122, 124, 126). The switch (131, 137) includes an electronically switchable holographic optical element HOE (131) having a first and a second mode of operation. Light from first and second light sources (124, 126) passes through HOE (131) in a diffracted manner in at least one of the first and second modes of operation. Light from a third light source (122) is reflected by a reflector (137) in a third mode of operation. The combiner (130) operates to combine light from the various light sources (122, 124, 126) into a common light path.

24 Claims, 3 Drawing Sheets

MULTI-STATE OPTICAL SWITCH AND COMBINER FOR USE IN A LIGHT ENGINE AND IMAGE PRESENTATION DEVICE USING THE SAME

FIELD OF THE INVENTION

The devices, methods, and systems described herein relate generally to optical light engines, particularly to optical switches and combiners for use with multi-color light sources, and image presentation devices utilizing the same.

BACKGROUND OF THE INVENTION

Some optical devices, such as, for example, rear projection television systems and digital micro-mirror (DMD) based image presentation devices employ multiple light sources having different colors. In order to support full color display capability, it is from time-to-time necessary for such devices, to combine the light output from the various color light sources into a common light path. While LEDs have, for some time, been used in various light source applications, such applications have generally been limited to low power and small screen image presentation devices. Due to advantages like lower cost, longer life, lower power consumption, and broader color gamut, when compared to conventional short-arc lamp light sources, there exists a growing need for semiconductor based illumination modules and light engines capable of high power and very high collection and throughput efficiencies. To this end, there is a need to provide illumination and light engine solutions that offer advantages in compactness, simplicity, low cost, and speed of operation.

The above and other features and advantages of the invention will be further understood from the following description of the preferred embodiments thereof, taken in conjunction with the accompanying drawings.

DETAILED DESCRIPTION OF A PREFERRED EMBODIMENT

The present description is directed in particular to elements forming part of, or cooperating more directly with, apparatus in accordance with the invention. As will be understood by those familiar with the art, aspects of the invention may be embodied in other specific forms without departing from the scope of the invention as a whole. Accordingly, the disclosures and descriptions herein are intended to be illustrative, but not limiting, of the scope of the invention which is set forth in the following claims.

Figure 1:
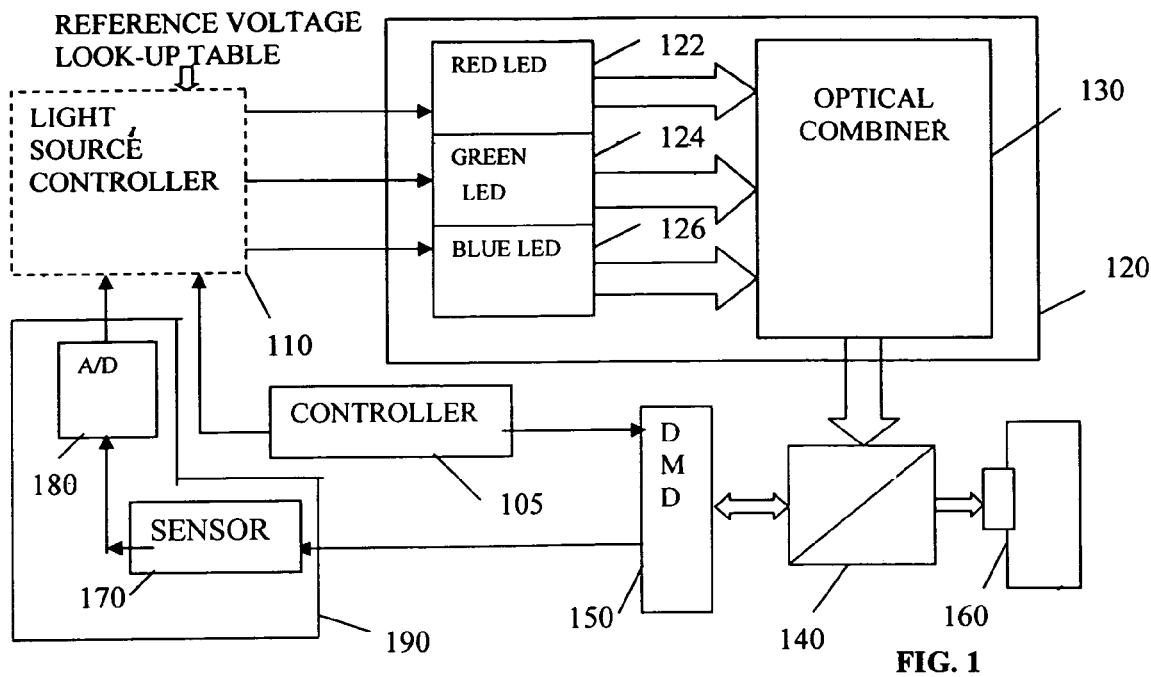
FIG. 1 is a diagram showing a digital micro-mirror (DMD) based image presentation device according to the present invention.

FIG. 1 shows a digital micro-mirror device (DMD) based image presentation device 100, in accordance with the present invention. Only elements necessary for the understanding of the invention are shown since DMD based image projection systems are well known in the art. The image presentation device 100 of the present embodiment is a rear projection television system, but can easily be a front projector or other micro-display based system. The device 100 utilizes red, green, and blue light emitting diodes (LEDs) 122,124,126 as light sources, although light sources such as lasers or other semiconductor based light emitting devices are contemplated. A primary advantage associated with the light source selection of the device 100 is reduced cost and complexity when compared to prior art systems that employ color wheels and various light filtration systems that are typically required to generate basic colors within the visible color spectrum.

Light sources 122, 124,126 are individually controlled to output light to an optical combiner 130. In the past, Optical combiner 130 consisted of a combination of collimation lenses, condenser lenses, and dichroic plates or prisms that together form part of a light engine 120 for the DMD based system. Various configurations of light engines that may be used with the present invention are known in the art and will not therefore be described or discussed in further detail. Optical combiner 130 is shown coupled to a TIR prism or field lens 140 which redirects light output from the optical combiner 130 to a DMD panel device 150. The DMD panel device 150 comprises a large number of microscopic mirrors that, in conjunction with a first or image processing mode of operation, selectively reflect light through the prism 140 and onto projection optics 160 for display on a screen (not shown) for operator viewing. The DMD panel device 150 and light source controller 110 operate under the control of a controller 105 that manages both the image processing and non-image processing modes of operation of the device 300. Controller 105 is preferably a digital light processor (DLP) application specific integrated circuit (ASIC) which has, in the past, been commercially available from Texas Instruments corporation.

As shown, the DMD panel device 150 is also coupled to sensor 170. In conjunction with a second or non-image processing mode of operation, light being incident through the prism 140, but not being projected onto projection optics 160 is input to the sensor 170. In response, sensor 170 outputs a signal representing the output from the light emitting diodes 122,124,126. The sensor output is converted by Analog to Digital (A/D) converter 180 to a digital control signal and then fed to light source controller 110 for purposes of adjusting individual and/or collective light source inputs to LEDs 122, 124, 126.

As will be appreciated by those skilled in the art, LEDs have the potential of wide range adoption as light sources in projection display system like the one described in association with FIG. 1. Due to numerous cost, size, power consumption, life expectancy, and complexity advantages exhibited by LEDs, when compared to traditional arc-lamp based illumination systems; there is a particular interest in adopting LEDs as the light source of choice for large screen television system applications. Technical hurdles standing in the way of this migration include, but are not limited to, light engine designs capable of delivering both high collection and sufficient light output (i.e., throughput efficiency) to support the needs of large screen viewing. It is therefore an advantage of present invention to offer a light engine 120 design capable of meeting the unique challenges of adapting LED or other semiconductor based light sources to large screen color displays.

Figure 2:
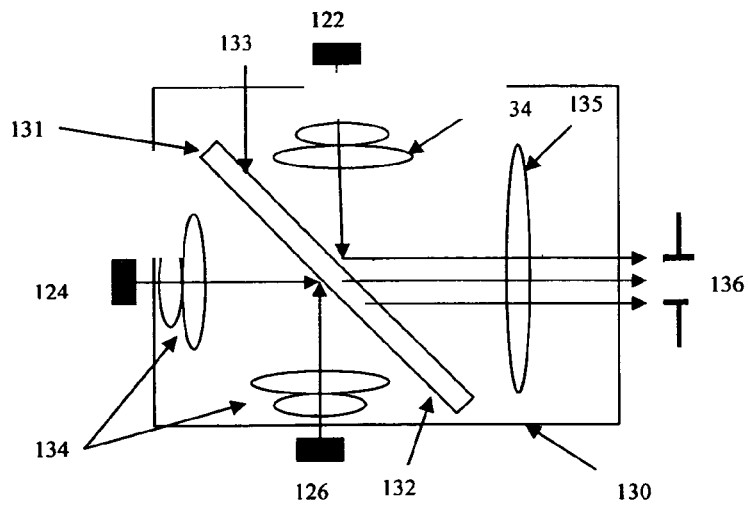
FIG. 2 is a block diagram illustrating an optical combiner for use with the digital micro-mirror (DMD) based image presentation device of FIG. 1.

FIG. 2 is a block diagram illustrating optical combiner 130 in accordance with a preferred embodiment of the invention. As shown, optical combiner 130 employs a multi-state photonic switch that uses a holographic optical element (HOE) 131, such as, for example, a liquid crystal device or similar apparatus that operates on the principles of Bragg grating. Such devices include, but are not limited to: polymer dispersed liquid crystal devices (PDLC), polymer dispersed cholesteric liquid crystal devices (PDCLC), holographic polymer dispersed liquid crystal devices (H-PDLC), and Bragg grating members. Generally, the principles of Bragg reflection/diffraction, and consequently "Bragg grating" means a periodically repeating layer of polymer and liquid crystal (LC) which forms LC planes having a spacing that satisfy the grating equation, $$A = \lambda/2n \sin(\Psi/2) \qquad (1)$$

Where $\lambda$ is the wavelength of the incident laser light, n is the average index of refraction of the holographic medium, and $\Psi$ is the angle between the interfering beams. When the light source and the observer are on the same side of the holographic film, the grating is known as a reflection grating. When the light source and the observer are on opposite sides of the holographic film, light is diffracted upon transmission through the holographic film and the grating is known as a transmission grating (i.e., transparent).

Of note, the holographic optical element (HOE) 131 is electronically switchable and therefore capable of operation in multiple modes and/or states, herein referred to as the "field-off" and "field-on" states, respectively. As will be appreciated by those skilled in the art, the "field-off" state occurs when no voltage is applied to HOE 131 input terminals (not shown). Conversely, the "field-on" state occurs when a voltage potential is applied to HOE 131 input terminals (not shown). In accordance with the preferred embodiment, HOE 131 is operable to transmit light in the "field-off" state and to Bragg reflect or diffract light in the "field-on" state. For a detailed description of "field-on" and "field off" operations, the interested reader is referred to "U.S. Pat. No. 5,875,012, issued Feb. 23, 1999 to Crawford et al., entitled BROADBAND REFLECTIVE DISPLAY, AND-METHOD OF FORMING SAME and U.S. Pat. No. 6,166,800 issued Dec. 26, 2000 to Silverstein et al., and entitled SOLID-STATE IMAGE CAPTURE SYSTEM INCLUDING H-PDLC COLOR SEPARATION ELEMENT, the subject matter of which are incorporated herein by reference in their entirety.

As illustrated in FIG. 2, optical combiner 130 employs a set of collimation lens 134 positioned between the electronically switchable holographic optical element (HOE) 131 and a first 122, a second 124, and a third 126 color LED light source. These lenses 134 are proximate to and adjacent each LED, for purposes of collecting the maximum permissible light emitted by LEDs (122-126) and directing that light to HOE 131 at an appropriate time. As will be appreciated after review hereof, HOE 131 includes one holographically formed liquid crystal reflective device having a receiving surface 132 and a reflecting surface 133. In accordance with one embodiment, the reflecting surface 133 of HOE 131 operates as a functionally integrated reflector 137, capable of reflecting light received from LED 122, independent of mode. During subsequent operation, HOE 131 is substantially transparent to light received during the first or "field-off" state. As such, light received at the receiving surface 132 of HOE 131 is transmitted or passed through HOE 131 without Bragg diffraction or Bragg reflection, and presented to condenser lens 135. During the second or "field-on" state, light received at the receiving surface 132 of HOE 131 is Bragg reflected or diffracted by HOE 131 and presented to condenser lens 135. Condenser lens 135 focuses the Red, Green, and Blue (RGB) light received from HOE 131 onto a common path and applies it directly to a light valve or to a medium, such as an integrator rod or similar mechanism 136, which serves as a light input/output interface for light engine 120. As such, HOE 131 operates in accordance with the present invention as a multi-state photonic switch capable of producing a broadband color response using a single Bragg grating. HOE 131 is electronically switchable to provide an optical transmitter and optical diffractor, with functionally integrated reflector, offering improved efficiency, higher throughput, lower cost, and simplicity and elegance of design.

Figure 3:
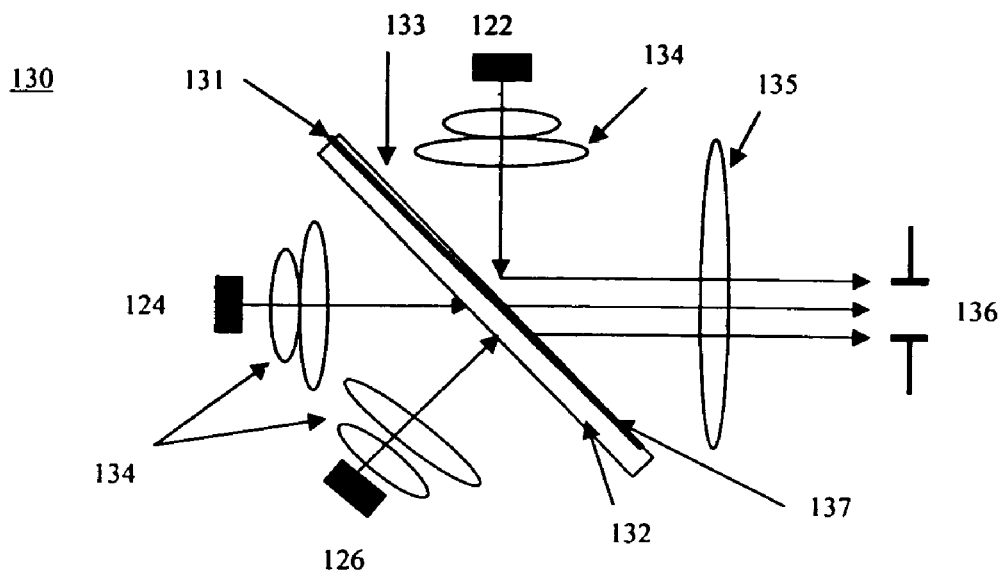
FIG. 3 is a block diagram illustrating another optical combiner in accordance with a preferred embodiment of the invention.

With reference to FIG. 3, a block diagram illustrating another optical combiner 130 is disclosed. Substantially similar to the optical combiner 130 of FIG. 2, the optical combiner of FIG. 3 is designed for use in the light engine 120 of FIG. 1, also referred to herein as an LED illumination module. The optical combiner of FIG. 3 discloses a reflector 137 disposed on the reflecting surface 133 of HOE 131. As such, reflector 137 is integrated into and made part of HOE 131. In accordance with one embodiment, reflector 137 reflects light at a first wavelength. In accordance with a preferred embodiment, reflector 137 reflects Red light produced by LED 122. Notwithstanding, reflector 137 is transparent to light at other wavelengths. In particular, reflector 137 is transparent to Green light produced by LED 124 and Blue light produced by LED 126. As such, Green light passes through reflector 137 during the "field-off" state, while Blue light passes through reflector 137 during the "field-on" state of operation. According to a preferred embodiment, reflector 137 is a layer of dichroic material disposed on the reflecting surface 133 of HOE 131. While the present invention suggests a red-reflective dichroic material for reflector 137, it will nevertheless be appreciated by those skilled in the art that other red-reflective and green, blue transparent materials can be substituted for the red-reflective dichroic material of reflector 137, without departing from the spirit and the scope of the present invention. In addition, while the preferred embodiment discloses Red light reflection, any one of the other color LEDs (124, 126) can be selected for reflection as taught by the present invention, without departing from the scope and spirit of the present invention.

During normal operation, HOE 131 is again substantially transparent to light received during the first or "field-off" state, when no electric field is applied to HOE 131. As such, light received from Green LED 124 at the receiving surface 132 of HOE 131 is transmitted or passed through HOE 131 without diffraction or Bragg reflection, and presented to condenser lens 135. During the second or "field-on" state, when an electric field is applied to HOE 131, light received from Blue LED 126 at the receiving surface 132 of HOE 131 is Bragg reflected or diffracted by HOE 131 and presented to condenser lens 135. Condenser lens 135 focuses the Red, Green, and Blue (RGB) light received from HOE 131 onto a common path and applies it to a medium, such as integrator 136, which serves as a light input/output interface for light engine 120. Based upon the foregoing description, it can be said that HOE 131 is electrically switchable to form multiple components; namely, an optical transmitter of light during the "field-off" state, an optical diffractor of light during the "field-on" state, and a reflector of light, independent of HOE mode or state. Notwithstanding, it is the ability to generate a broadband color response in an optical combiner using a single Bragg grating as a multi-state photonic switch, that offers the preset invention significant advantage over prior art systems in size, cost, and throughput efficiency. Of additional interest, due to the differing indices of refraction exhibited by HOE 131 during the "field-on" and "field-off" states, light received at the receiving surface 132, from Blue LED 126, is not directed by the HOE 131 into the integrator 136, during the "field-off" state. Similarly, light received at the receiving surface 132, from Green LED 124, is not directed by the HOE 131 into the integrator 136, during the "field-on" state.

Figure 4:
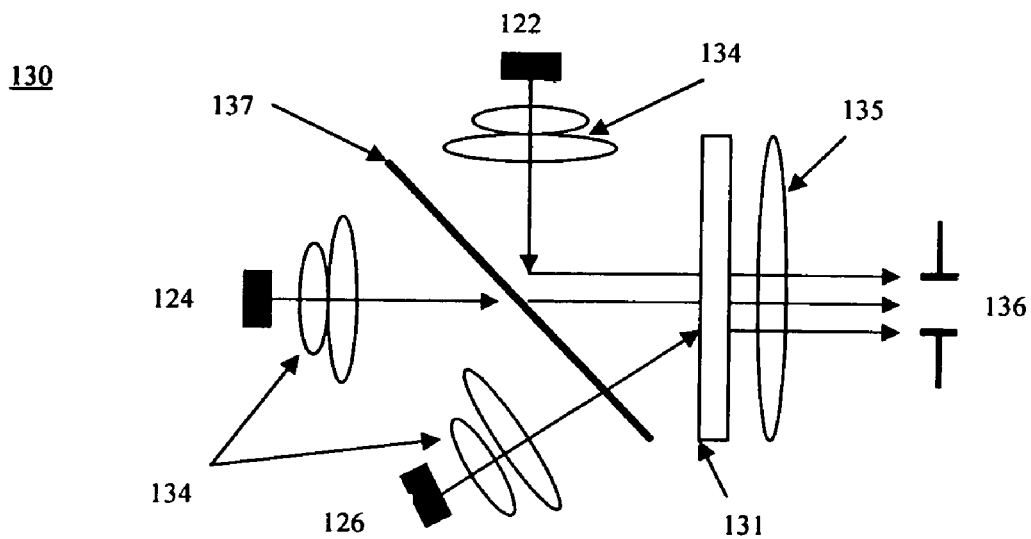
FIG. 4 is a block diagram illustrating yet another optical combiner in accordance with a preferred embodiment of the invention.

FIG. 4 is a block diagram illustrating yet another optical combiner 130. Similar to the optical combiner 130 of FIG. 3, the optical combiner 130 of FIG. 4 is designed for use in the light engine 120 of FIG. 1, also referred to herein as an LED illumination module. The optical combiner of FIG. 4 employs a multi-state photonic switch 131,137 implemented as an electronically switchable HOE. As previously discussed, HOE 131 may comprise any of the well known reflective/transmissive polymer devices, that operate on well known Bragg principles. Such devices include, but are not limited to: Bragg gratings, Polymer Dispersed Liquid Crystal (PDLC), Polymer Dispersed Cholesteric Liquid Crystal (PDCLC), Polymer Stabilized Cholesteric Texture (PSCT), Holographic Polymer Dispersed Liquid Crystal (H-PDLC) technologies and the like.

In order to realize recognizable size reduction over the prior embodiments, HOE 131 is shown having a substantially vertical orientation and is positioned both in close proximity to and parallel with condenser lens 135. The parallel orientation of HOE 131 makes for a smaller device foot print. It also makes the opposite side more difficult for use as a reflector as described before for other embodiments. As depicted, the optical combiner 130 of FIG. 4 has a transparent member 137 covered with a layer of red-reflective dichroic material. The transparent member 137 with dichroic material layer operates as the reflector depicted in the prior embodiments of the present invention. As seen, transparent member 137 is disposed in the optical path created by light beams sourced from light sources 122, 124, 126. As in past depictions, HOE 131 has first 132 and second 133 opposing sides. In accordance with the present embodiment, Green and Blue LED light sources (124, 126) are oriented to direct light toward the first side 132 of HOE 131. In contrast to other described embodiments, however, in the embodiment of FIG. 4, the Red light source 122 is oriented to direct light toward transparent member/reflector 137 instead of the second side 133 of the Bragg grating 131. This is due in part to the fact that reflector 137 is now disposed on transparent member 137 which is adjacent to, rather than disposed on a surface 133 of HOE 131.

During normal operation, HOE 131 is again substantially transparent to light received during the first or "field-off" state, when no electric field is applied to HOE 131. As such, light received from Green LED 124 at the receiving surface 132 of HOE 131 is transmitted or passed through HOE 131 without diffraction or Bragg reflection, and presented to condenser lens 135. During the second or "field-on" state, when an electric field is applied to HOE 131, light received from Blue LED 126 at the receiving surface 132 of HOE 131 is Bragg reflected or diffracted by HOE 131 and presented to condenser lens 135. Red light from LED 122 is reflected off member 137 and reflected or propagated to HOE 131 where it is transmitted to Condenser lens 135. Condenser lens 135 focuses the Red, Green, and Blue (RGB) light received from HOE 131 onto a common path and applies it directly to a light valve or to a medium, such as an integrator 136, which serves as a light input/output interface for light engine 120.

Figure 5:
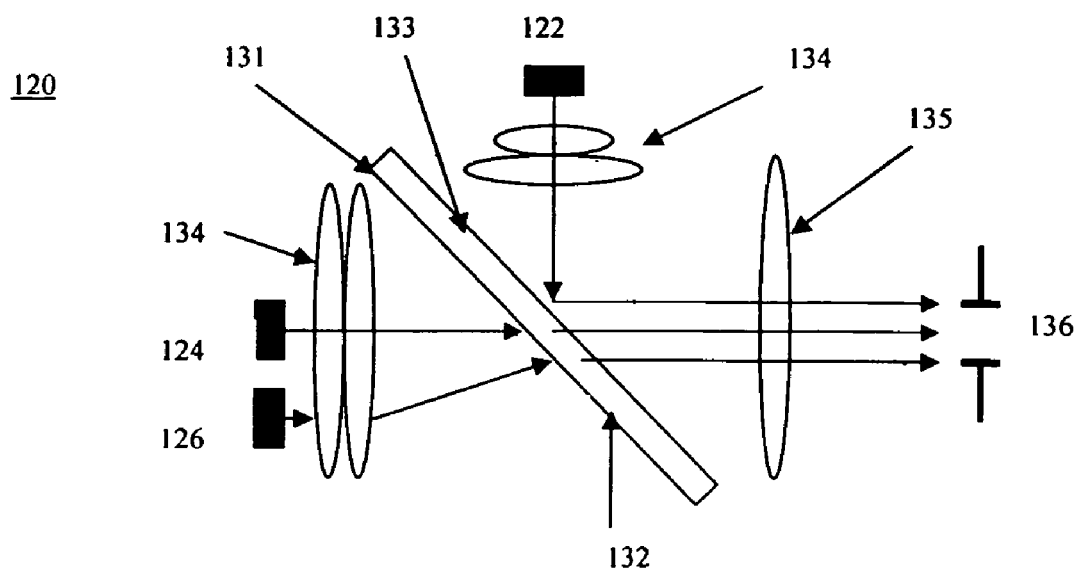
FIG. 5 is a block diagram illustrating an alternate optical combiner in accordance with a preferred embodiment of the invention.

FIG. 5 is a block diagram illustrating an alternate optical combiner 130 in accordance with a preferred embodiment of the present invention. As will be appreciated after review hereof, the optical combiner 130 of FIG. 5 operates in complete accordance with the description as set forth in association with FIG. 3. The difference being, LEDs 124 and 125 share a set of collimation lenses, there by reducing both the cost and the size of the device implemented in FIG. 5. Notwithstanding, it is once again the ability to generate a broadband color response in an optical combiner using a single Bragg grating that offers the preset invention significant advantage over prior art systems in size, cost, and throughput efficiency.

While preferred embodiments of the invention have been illustrated and described, it will be clear that the invention is not so limited. Numerous modifications, changes, variations, substitutions and equivalents will occur to those skilled in the art without departing from the spirit and scope of the invention as defined by the appended claims. For example, LCOS, LCD and other micro-display devices may be used instead of a DMD for image processing purposes. In another example, optical combiner 130 may substitute any color LED for the Red LED 122. As such the combiner may employ one of Green and/or Blue light reflection, while light from the Red LED 122 will either pass through during the "field-off" state, or conversely, will be Bragg reflected during the "field-on" state. In yet another anticipated alteration, the "field-off" and "field-on" states of HOE 131 can be reversed, such that during the "field-off" state, HOE 131 supports Bragg reflection/transmission and operates as an optical diffractor, while during the "field-on" state HOE 131 operates as an optical transmitter. In addition, the angle of incident for the various color LEDs can vary, as shown in FIGS. 2-5, without departing from the scope and spirit of the present invention.

What is claimed is:

1. A multi-state photonic switch comprising:
   an electronically switchable holographic optical element (HOE);
   a reflector, optically coupled to the holographic optical element (HOE),
   wherein the holographic optical element (HOE) is functionally integrated with the reflector to provide first, second, and third modes of operation for directing light to a common light path, the first mode corresponding to a primarily transparent mode of light transmission, the second mode corresponding to a primarily diffractive mode of light transmission, and the third mode corresponding to a primarily reflective mode of light propagation; wherein the reflector reflects visible light of a first wavelength and is transparent to visible light of at least two other wavelength; and wherein the reflector is integrated with the holographic optical element (HOE); and wherein the reflector comprises a dichroic material disposed on a surface of the HOE.

2. The multi-state photonic switch of claim 1, wherein the holographic optical element (HOE) operates on principles of Bragg Grating.

3. The multi-state photonic switch of claim 2, wherein the holographic optical element (HOE) is one of a reflective liquid crystal device, and a Bragg Grating member.

4. The multi-state photonic switch of claim 1, wherein the reflector reflects visible light of a first wavelength and is transparent to visible light of at least two other wavelengths.

5. The multi-state photonic switch of claim 4, wherein the reflector reflects red light and is transparent to blue and green light.

6. An optical combiner for use with a plurality of LED light sources capable of generating different color light beams, said optical combiner comprising:

an electronically switchable holographic optical element (HOE) having a receiving and a reflecting surface, and operational in a first and a second mode; and a condenser lens, optically coupled to the HOE, for focusing light received from the HOE into a common light path, wherein the holographic optical element (HOE) is substantially transparent to light received from a first light source, during the first mode of operation, diffracts light received from a second light source, during the second mode of operation, and reflects light received at the reflecting surface.

7. The optical combiner of claim 6, wherein the holographic optical element (HOE) operates on principles of Bragg Grating.

8. A light emitting diode (LED) illumination module comprising:

first, second, and third color LED light sources; and an electronically switchable holographic optical element (HOE) having a receiving and a reflecting surface, and operational in a first and a second mode, wherein the holographic optical element (HOE) is substantially transparent to light received at the receiving surface, during the first mode of operation, diffracts light received at the receiving surface, during the second mode of operation, and reflects light received at the reflecting surface, and wherein light received during the first and second mode of operation is directed toward a common light path.

9. The LED illumination module of claim 8, wherein the holographic optical element (HOE) exhibits first mode of operation when no electric field is applied to the HOE.

10. The LED illumination module of claim 9, wherein light received at the receiving surface from a first LED, passes through the HOE without diffraction, during the first mode of operation.

11. The LED illumination module of claim 9, wherein light from a second LED, during the first mode of operation, is not directed through the HOE toward the common light path.

12. The LED illumination module of claim 8, wherein the holographic optical element (HOE) exhibits second mode of operation when an electric field is applied to the HOE.

13. The LED illumination module of claim 12, wherein light received at the receiving surface, from the second LED, passes through the HOE and exhibits diffraction, during the second mode of operation.

14. The LED illumination module of claim 12, wherein light received at the receiving surface, from the first LED, is not directed through the HOE toward the common light path, during the second mode of operation.

15. The LED illumination module of claim 8, further comprising a reflector, functionally integrated into the reflecting surface of the HOE.

16. The LED illumination module of claim 15, wherein the reflector reflects light at a first wavelength and is transparent to light at other wavelengths.

17. An image presentation device comprising:

red, green, and blue LED light sources;

a set of collimation lens adjacent to each LED to collect and direct light as emitted from each LED as a light beam; and an optical combiner, positioned to receive light beams from each set of collimation lens, comprising:

an electronically switchable holographic optical element (HOE), having a receiving and a reflecting surface, and operational in a first and a second mode, and a condenser lens, optically coupled to the HOE, for focusing light received from the HOE into a common light path, wherein the holographic optical element (HOE) is substantially transparent to light received at the receiving surface, during the first mode of operation, diffracts light received at the receiving surface, during the second mode of operation, and reflects light received at the reflecting surface.

18. The image presentation device of claim 17, wherein the holographic optical element (HOE) exhibits first mode of operation when no electric field is applied to the HOE.

19. The image presentation device of claim 18, wherein light received at the receiving surface, from the green LED, passes through the HOE without diffraction, during the first mode of operation.

20. The image presentation device of claim 18, wherein light received at the receiving surface, from the blue LED, is not directed through the HOE toward the condenser lens and into the common light path, during the first mode of operation.

21. The image presentation device of claim 17, wherein the holographic optical element (HOE) exhibits second mode of operation when an electric field is applied to the HOE.

22. The image presentation device of claim 21, wherein light received at the receiving surface, from the blue LED, passes through the HOE with diffraction, during the second mode of operation.

23. The image presentation device of claim 21, wherein light received at the receiving surface, from the green LED, is not directed through the HOE toward the condenser lens and into the common light path, during the second mode of operation.

24. The image presentation device of claim 17, further comprising a reflector, functionally integrated into the surface of the HOE, that reflects light at a first wavelength and is transparent to light at other wavelengths.

* * * * *